United States Patent Office 3,432,542
Patented Mar. 11, 1969

1

3,432,542
POLYMERIC SULFUR COMPOUNDS FROM ALLENE
Derek L. Ransley, Berkeley, Calif., assignor to Chevron Research Company, San Francisco, Calif., a corporation of Delaware
No Drawing. Filed Dec. 6, 1963, Ser. No. 328,461
U.S. Cl. 260—481        9 Claims
Int. Cl. C07c 149/20, 149/00

---

ABSTRACT OF THE DISCLOSURE

Sulfur containing polymers are produced by the liquid phase reaction of allene with a bis-thiol. The reaction occurs in the liquid phase under free radical catalysis and at a temperature below about 150° C.

---

The present invention is directed to the production of $\alpha,\omega$-bis-thiol-trimethylene backbone polymers. More particularly, it is directed to the production of substantially linear intermediate molecular weight $\alpha,\omega$-bis-thiol polymers having from 2 to 10 trimethylene groups in the polymer chains. Still more particularly, it is directed to the production of $\alpha,\omega$-bis-thiols characterized by the general formula:

(1)    $H(SRSCH_2CH_2CH_2)_nSRSH$ wherein $n$ is a number in the range 2–10, inclusive, and R is a bivalent group relatively inert to free radical attack, having from 2–20 carbon atoms per group.

In the process of the present invention, known $\alpha,\omega$-bis-thiols characterized by the general formula:

(2)    $HS—R—SH$ wherein R is a bivalent group as in the prior formulation, having a negative relative free radical reactivity and a radical weight greater than 27 but less than 266 molecular weight units, are contacted under autogenous pressure with allene in the presence of an organic inert liquid diluent under liquid phase free radical reaction conditions. Under these conditions, the corresponding bis-thiol polymer represented by Formula 1 above is produced.

By a negative relative free radical reactivity for the group R is meant that when the analogous compound HRH is tested under standard conditions in the presence of allene and n-hexyl thiol, for all practical purposes, only n-hexyl thiol adducts to the allene.

By standard test conditions is meant the following:

| | | |
|---|---|---|
| Temperature | ° C | 50 |
| Allene | mols | 0.1 |
| n-Hexyl thiol | do | 0.2 |
| Azobis-isobutyronitrile | grams | 1 |
| Time | hrs | 0.2 |
| HRH | mols | 0.2 |
| Pressure | | Autogenous |
| Benzene | cc | 50 |

All known radical groups R, the HRH analogs of which have a negative relative free radical reactivity are satisfactory components of the class of $\alpha,\omega$-bis-thiols useful in the present process.

Representative and preferred bis-$\alpha,\omega$-thiols,

HS—R—SH include $HS—(CH_2)_2SH$, $HSCH_2CH(CH_3)CH_2SH$, $HSC_6H_{10}SH$ (o, m and p)-$(HSCH_2)_2C_6H_4$,

$HSCH(CH_3)(CH_2)_{17}CH_2SH$ $HSCH_2(CH_2)_{10}CH_2SH$, (o, m and p)-$(HS)_2C_6H_4$, 1,4-

2 cyclohexane dithiol, $HSCH_2CH(C_5H_{11})(CH_2)_3SH$ and the like, that is, in general, $\alpha,\omega$-bis-thiols of the above general formula wherein R is a hydrocarbylene bivalent radical group having from 2 to 20 carbon atoms and is free of olefinic unsaturation. Preferably, the dithiols useful in the process have molecular weights less than about 300 units for reasons of practicality.

Other representative useful $\alpha,\omega$-thiols include those in which two or more hydrocarbylene radical groups are linked by inert linking groups including ether oxygen, —O—, i.e., —R—O—R—, sulfide sulfur, —S—, i.e., —R—S—R—, carbonyl,

i.e.,

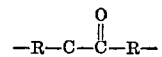

and combinations thereof. In every case these inertly linked hydrocarbylene-bivalent radical groups have the necessary negative free radical relative reactivity which makes them useful in the present process. Molecular weights of these linked hydrocarbylene bis-$\alpha,\omega$-thiols are desirably less than 300 units.

Representative inertly linked hydrocarbylene $\alpha,\omega$-bis-thiol compounds include $HS(CH_2)_2O(CH_2)_2SH$,
$HSCH_2CO_2(CH_2)_2O_2CCH_2SH$,
$HS(CH_2)_2S(CH_2)_2SH$,
$HS—(CH_2)_2CO(CH_2)_2SH$,
$HSC(CH_3)_2O(CH_3)_2SH$,
$HS(CH_2)_8CO(CH_2)_8SH$,
$HSCH_2CO_2(CH_2)_2SH$,
$HS(CH_2)_2O(CH_2)_2O(CH_2)_2SH$ and the like.

By inert liquid diluents is meant those relatively unreactive organic solvents such as alkanes, aromatic hydrocarbons, benzene, chlorobenzene, bromobenzene, cyclohexane, heptane, octane and the like which do not compete favorably under free radical reaction conditions with thiols and allene in a determinative product sense to produce or yield free radicals. That is, no solvent molecule becomes a component of the compounded products under reaction conditions.

By liquid phase free radical reaction conditions is meant the contacting of a liquid mixture of thiol and allene, preferably allene and thiol in the presence of an inert liquid diluent under catalytic free radical generating conditions, including thermal dissociation of known organic free radical precursor compounds, such as organic peroxidic and organic azo compounds, as well as free radical generation in the reaction medium by irradation by radiant energy, including high energy, high frequency vibrational means, light, electron bombardment and the like.

In general, suitable reaction temperatures are in the range from below about 150° C. to above the temperature of the melting point for the particular reaction mixture. Preferably, reaction temperatures below about 100° C. are employed.

Representative free radical precursor compounds are azobis-isobutyronitrile, benzoyl peroxide, di-tertiary butyl peroxide, cumene hydroperoxide, methyl ethyl ketone hydroperoxide, lauroyl diperoxide, t-butylperacetate, t-butylperbenzoate, di-t-butyldiperthalate and the like, that is, known organic compounds capable of thermal dissociation at temperatures below 150° C., thereby yielding free radical fragments capable of initiating free radical n-hexyl thiol addition to n-hexene-1. In general, from about 1 to 10 mol percent (based on thiol) of the free radical precursor compounds are required.

In a preferred embodiment of the present process, benzene and the desired α,ω-substituted dithiol, for example, HS(CH₂)₂SH, are charged to an autoclave in which the relative volume relationship of benzene to thiol employed is about 0.5–100 volumes of benzene for each volume of the thiol. In addition, allene in an amount such that the mol ratio of thiol to allene is preferably about 1:1, which corresponds to stoichiometric requirements, and from about 1–4% (based on thiol) of a free radical reaction catalyst, for example, azobis-isobutyronitrile, are charged to the autoclave. Under autogenous pressure and at a temperature of about 50° C., reaction commences as shown by a drop in the autoclave pressure. When the autoclave pressure becomes relatively stabilized, an increase of temperature, for example, to 65° C. and higher, usually serves to drive the reaction farther towards completion. In general, reaction periods of from 0.5–10 hours are adequate but may vary depending upon the particular feed, its purity and the particular free radical initiator means employed. In any event, the reaction is best and most conveniently monitored by following the pressure change.

In general and because the products are relatively high molecular weight materials, recoveries by filtration, washing, crystallization, solvent removal and the like are most convenient.

The α,ω-high molecular weight dithiol polymers of the present invention are useful per se as antioxidants, by reason of their sulfur atom content. They are particularly useful as cross-linking and gelling agents for unsaturated polyesters and for the curing of rubber.

EXAMPLE 1

α,ω-Hydrocarbylene thiol adduction

Into a Pyrex pressure reactor fitted for stirring were charged 0.102 mol of ethylene dithiol, 0.125 mol allene and 4.1% by weight based on the dithiol of azobis-isobutyro-nitrile. Under autogenous pressure the reaction mixture was maintained at a temperature in the range 50–65° C. for 130 minutes. An essentially quantitative yield of propane backbone polymer,

H[SCH₂CH₂SCH₂CH₂CH₂]₂.₆SCH₂CH₂SH was recovered having the following physical characteristics:

| | |
|---|---|
| Mol weight (in benzene) | 392 |
| Infrared analysis: | |
| End group, carbons/SH, calculated | 8.0 |
| End group, carbons/SH, found | 8.5 |
| Nuclear magnetic resonance analysis: | |
| Ratio CH₂S protons to remainder, calculated | 3.33 |
| Ratio CH₂S protons to remainder, found | 3.14 |
| Multiplet, p.p.m.—downfield | 2.7–3.6 |
| From tetramethylsilane | 1.5–2.4 |

The polymer was a viscous colorless oil.

EXAMPLE 2

Inertly linked hydrocarbylene α,ω-dithiol adduction

As in Example 1, except that 0.1 mol of ethylene-bithioglycolate, 0.125 mol of allene and 5.6% of the azobis-isobutyronitrile were charged to the reactor, a reaction temperature of 50–65° C. was maintained for 235 minutes. An essentially quantitative yield of propane backbone polymer,

H[SCH₂CO₂(CH₂)₂O₂CCH₂SCH₂CH₂CH₂]₁.₇
SCH₂CO₂(CH₂)₂O₂CCH₂SH was recovered having the following physical characteristics:

| | |
|---|---|
| Mol weight (in benzene) | 934 |
| Infrared analysis: | |
| Peaks, cm.⁻¹ | 1750, 1270 |
| Nuclear magnetic resonance analysis, p.p.m.[a]: | |
| Singlets | 4.46, 3.37 |
| Triplet | 2.84 |
| Multiplet | 1.5–2.3 |

[a] Downfield from tetramethylsilane.

The polymer was a viscous colorless oil.

Preferred ratios of mols of allene per mol of dithiol are in the range 0.5 to 5, and particularly in the range 1.0 to 1.5, for the reason that though a 1:1 ratio is particularly desirable, a slight excess of allene is useful since it is not all dissolved in the liquid and, therefore, less available for reaction.

Representative propane-1,3 backbone α,ω-dithiol polymers are as follows:

H(SCH₂CH₂SCH₂CH₂CH₂)ₙSCH₂CH₂SH,
H[SCH₂CO₂(CH₂)O₂CCH₂SCH₂CH₂CH₂]ₙSCH₂CO₂
(CH₂)₂O₂CCH₂SH,
H[SCH₂C₆H₁₀CH₂SCH₂CH₂CH₂]ₙSCH₂C₆H₁₀CH₂SH, etc., where n is in the range 2–10.

The polymer as prepared in Example 2 was tested as a gelling agent for an unsaturated polyester (isophthalic:maleic:propylene glycol—1:1:2.1) styrene mixture, 60:40 parts respectively, as follows:

| | A | B |
|---|---|---|
| Polyester mixture, parts | 20 | 20 |
| Bisphenol A diglycidyl ether | 6 | 6 |
| Example 2 polymer | | 1 |
| m-Xylylenediamine | 2.2 | 2.2 |
| Gel time, room temperature, hours | 24 | .02 |

The foregoing descriptive embodiments of the present invention are illustrative only. It is not the intent that the invention shall be construed as limited to the details of the description, except insofar as such limitations have been included in the terms of the following claims.

I claim:
1. Process for the production of α,ω-bis-thiopropane-1,3-backbone polymers which comprises reacting allene with an α,ω-bis-thiol of the formula

HSRZRSH wherein Z is a bivalent radical selected from the group consisting of

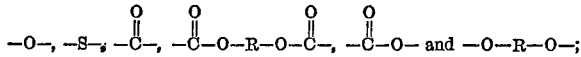

wherein R is a bivalent hydrocarbylene group having from 2 to 20 carbon atoms and is free of olefinic unsaturation; and wherein the molecular weight of said bis-thiol is less than 265, said reaction being carried out by maintaining a liquid phase mixture of said reactants under catalytic free radical generating conditions and at a temperature below about 150° C., thereby producing the corresponding α,ω-bis-thio-trimethylene backbone polymer of the formula

H[SRZRSCH₂CH₂CH₂]ₙSRZRSH wherein n is a number in the range 2–10.
2. The process of claim 1 further characterized in that the reaction is effected:
  (a) at a temperature below about 100° C.;
  (b) in the presence of a diluent selected from the group consisting of inert organic diluents; and
  (c) with a mol ratio of said bis-thiol to allene of about 1:1.
3. The process of claim 1 further characterized in that said bis-thiol is selected from the group consisting of ethylenebithioglycolate and ethylene dithiol.

4. Process for the production of α,ω-bis-thiol-propane-1,3 backbone polymers characterized by the general formula:

$$H(SRSCH_2CH_2CH_2)_nSRSH$$

wherein $n$ is a number in the range 2–10 which comprises reacting allene with an α,ω-bis-thiol of the formula $$HSRSH$$

wherein R is a bivalent hydrocarbylene group having from 2 to 20 carbon atoms and is free of olefinic unsaturation, said reaction being effected by maintaining a liquid phase mixture of said reactants under catalytic free radical generating conditions and at a temperature below about 150° C., thereby producing the corresponding α,ω-bis-thio-trimethylene backbone polymer.

5. The process as in claim 4 wherein said reaction temperature is below about 100° C.

6. The process of claim 4 wherein for each volume of said thiol, said reaction mixture contains from about 0.5 to 100 volumes of an organic diluent selected from the group consisting of inert diluents.

7. The process of claim 4 wherein the mol ratio of said dithiol to allene is about 1:1–1.5.

8. The composition $$H(SCH_2CH_2SCH_2CH_2CH_2)_nSCH_2CH_2SH$$

wherein $n$ is a number in the range 2–10.

9. The composition $$H[SCH_2CO_2CH_2CH_2O_2CCH_2SCH_2CH_2CH_2]_n\\SCH_2CO_2CH_2CH_2O_2CCH_2SH$$

wherein $n$ is a number in the range 2–10.

References Cited

Jacobs et al.: "J. Org. Chem.," vol. 28 (October 1963), pp. 2692–2698.

LORRAINE A. WEINBERGER, *Primary Examiner.*

M. G. BERGER, *Assistant Examiner.*

U.S. Cl. X.R.

204—162; 260—597, 609.